March 9, 1965 HIROSHI INOSE ETAL 3,172,956

TIME DIVISION SWITCHING SYSTEM FOR TELEPHONE SYSTEM UTILIZING TIME-SLOT INTERCHANGE

Filed April 27, 1960 3 Sheets-Sheet 1

INVENTORS H. INOSE
J. P. RUNYON

BY R. C. Winter
ATTORNEY

March 9, 1965 HIROSHI INOSE ETAL 3,172,956

TIME DIVISION SWITCHING SYSTEM FOR TELEPHONE SYSTEM UTILIZING TIME-SLOT INTERCHANGE

Filed April 27, 1960 3 Sheets-Sheet 2

INVENTORS H. INOSE
J. P. RUNYON
BY R. C. Winter
ATTORNEY

March 9, 1965 HIROSHI INOSE ETAL 3,172,956

TIME DIVISION SWITCHING SYSTEM FOR TELEPHONE SYSTEM UTILIZING TIME-SLOT INTERCHANGE

Filed April 27, 1960 3 Sheets-Sheet 3

INVENTORS H. INOSE
J. P. RUNYON

BY R. C. Winter

ATTORNEY

United States Patent Office 3,172,956

Patented Mar. 9, 1965

3,172,956

TIME DIVISION SWITCHING SYSTEM FOR TELEPHONE SYSTEM UTILIZING TIME-SLOT INTERCHANGE

Hiroshi Inose, Tokyo, Japan, and John P. Runyon, Mendham, N.J., assignors to Bell Telephone Laboratories, Incorporated, New York, N.Y., a corporation of New York Filed Apr. 27, 1960, Ser. No. 24,994
19 Claims. (Cl. 179—15)

This invention relates to communication systems and more particularly to a telephone system operating on a time division multiplex basis.

The current practice in telephone systems is to establish a solid connection between a calling and a called line via a path which is associated individually and uninterruptively with the connection for the duration of the call. Thus a quantity of equipment, dependent upon the number of lines served and the expected frequency of service, is provided in a common pool from which portions may be chosen and assigned for a particular call. Such a system arrangement is referred to as "space separation" in which privacy of conversation is assured by the separation of individual conversations in space.

In contrast, telephone systems have been developed which operate on a time separation basis in which a number of conversations share a single path. Privacy of conversations is assured in such systems by separation of individual conversations in time. Thus each call as assigned to the common path for an extremely short but rapidly and periodically recurring interval, and the connection between any two lines in communication is completed only during these short intervals or time slots. Samples which retain essential characteristics of the voice or other signal are transmitted in these time slots and are utilized in the called line to reconstruct the original signal so that the reception of signals of any complexity through the time division network is entirely satisfactory.

It is necessary that such a time division system identify and remember which lines have been assigned which time slots in the recurring cycle so that active lines will always be sampled at the proper time. Such operations may be synchronous in which case the same time slot is assigned to the calling and called lines. A system employing such synchronous operation is described in patent application Serial No. 760,502, filed September 11, 1958, of D. B. James et al., now Patent 2,957,949, issued October 25, 1960. This type of operation is entirely satisfactory from a traffic standpoint in systems which include a single control facility common to all subscriber lines. However, a blocking problem is introduced when the system is expanded to include geographically remote groups of subscriber lines for which individual switching and control facilities are provided to concentrate the lines for connection to the central office. All of this equipment at the remote location and in the central office control is referred to as the concentrator; that in the remote area is known as the remote concentrator, while the associated equipment in the central office is referred to as the concentrator controller.

To illustrate this blocking problem, consider that a telephone subscriber associated with a first concentrator of a multiconcentrator system places a call to a subscriber in a second concentrator. A specific number of time slots are available in each concentrator for assignment to telephone connections in accordance with the particular traffic requirements. In a synchronous operation, as indicated, a connection is completed only when there is a time slot available in which both of the concentrators concerned are idle. Consider, for example, that the first time slot in the office cycle, designated time slot 1, is idle in the first concentrator. Thus it may be assigned to the calling line. However, in attempting to complete a connection through the second concentrator to the called line, it is found that time slot 1 in that concentrator is being utilized on another call. Thus the instant connection is blocked from utilizing time slot 1 and a delay is encountered while a common idle time slot is being determined.

This problem is further aggravated as additional switching stages through which the connection must be established are added to the system. In this instance the chances of any one time slot being idle simultaneously in the originating and terminating concentrators as well as in the intermediate switching stages are slight, and the possibility that complete blocking and loss of the call will occur is increased.

It is a general object of this invention to provide an improved time division multiplex communication system.

It is another object of this invention to provide a time division telephone system in which the traffic handling capacity may be improved without increasing the number of available time slots. More specifically, it is an object of this invention to minimize the blocking problem in time division switching systems.

These and other objects of the invention are attained in one specific illustrative embodiment wherein a time division telephone system comprises distinct groups of telephone lines remote from one another and connected through corresponding line concentrators to a control center in accordance with the aforementioned James et al. patent. The telephones associated with each concentrator are controlled on a time division multiplex basis, such that the various concentrators are each connected to the control center via a corresponding transmission channel.

When a subscriber associated with a first concentrator places a call to a subscriber associated with a second concentrator, the office control equipment initially assigns an idle time slot to the calling line. It then proceeds to determine the status of that time slot in the second concentrator. If the time slot is idle in both concentrators, the office control will complete the connection in a routine manner. However, if the time slot is occupied on another call in the second concentrator and thus not available to accommodate the instant call, the office control is interrogated further in order to determine the first available time slot in the second concentrator. This is a purely random selection and bears no relationship to the time slot assigned in the originating concentrator.

Upon locating such an idle time slot in the second concentrator, the identity of both time slots is registered and transmitted to switching circuitry at appropriate times so as to complete the connection to the calling party in one time slot and to the called party in another time slot. In this fashion a transposition of time slots is accomplished, thus obviating the time slot blocking problem prevalent in systems in which the same time slot must be assigned to a conversation connected through a plurality of concentrators.

In accordance with this specific embodiment of the invention, the switching operation necessary to accomplishment of the transposition is effected by connecting concentrator so as to receive all information incoming from active telephone lines associated with the concentrator. The taps are placed at points corresponding to the duration of each time slot in the cycle of time slots. Each tap is connected to a distinct gate, the outputs of which are connected in multiple to the transmission channels leading to each of the other concentrators. A translating device, receiving time slot designations from the office control, selectively controls the operation of these gates. Another translating device activates switches at selected cross-points to complete the talking connection in the appropriate time slots. Thus all information received in the time slot assigned to the calling line is automatically transferred to the time slot assigned to the called line, and the connection is completed in the latter time slot. The inverse transportation is effected for information transmitted in the opposite direction.

In accordance with an aspect of this invention, the single transmission channel link connected to the output of the tapped delay line in each concentrator may be replaced by a plurality of links for cross connection with the called lines, the number of links being determined by specific traffic requirements of the system. This expedient obviates a difficulty experienced in the time slot interchange process which may be illustrated by a simple example.

Consider that the establishment of two calls is attempted, the first between concentrators A and B and the second between concentrators A and C. Assume that time slots 1 and 2 are utilized for the first call, time slot 1 being assigned to the telephone in concentrator A and time slot 2 to the telephone in concentrator B. Thus the delay line in concentrator A is tapped in such a manner that the information sampled in time slot 1 is transposed into time slot 2 on the transmission channel to concentrator B. Now assume that the calling party in concentrator C, seeking to establish the second call to concentrator A, is assigned time slot 2. Irrespective of the idle time slots in concentrator A, it would be impossible to complete this connection in that concentrator A would again be required to transpose information from the called party into time slot 2 for transmission to the calling party in concentrator C. However, the transmission channel is already busy in time slot 2 transmitting information to concentrator B on the first call. Utilizing plural links connected to the delay line output permits the transfer of such calls as the succeeding call in the above example to a different link.

This peculiar blocking problem may be further reduced by adding additional links, the reduction required and thus the number of additional links desired being a traffic consideration of the particular system involved. Alternatively, the number of time slots available for transpositions may be limited in accordance with the number of taps on the delay line in order to conserve gating equipment while establishing the blocking probability within a range consistent with traffic considerations.

It is a feature of this invention that distinct circuitry and components be arranged in a time division communication system to permit the assignment of a first time slot to a calling line in one concentrator and the assignment of a time slot distinct from the first time slot to the called line in another concentrator.

More particularly, it is a feature of this invention that means be provided for each concentrator of a time division communication system for delaying information received from a calling subscriber line in a first distinct time slot so that it will be transmitted in a second distinct time slot to the called subscriber line.

It is another feature of this invention that the delay means comprise a tapped delay line connected in the transmission channel between the calling and called lines.

It is a further feature of this invention with respect to a connection between two subscriber lines in different concentrators that the outputs of the tapped delay line in the originating concentrator be controlled by a translator receiving a designation of the time slot assigned to the terminating concentrator.

It is a feature in accordance with one aspect of this invention that the common transmission bus connected to the output of the delay line in each concentrator comprise a plurality of distinct links and that translating means be provided for selecting a particular one of the plurality of links for completion of a connection between subscriber lines.

A complete understanding of this invention and of these and various other features may be gained from consideration of the following detailed description and the accompanying drawing, in which.

Figure 1:
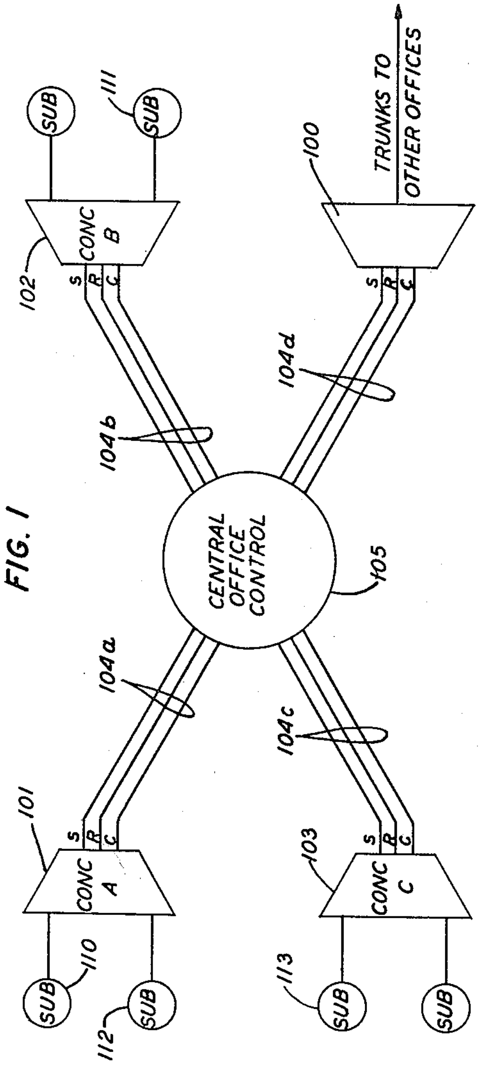
FIG. 1 is a block diagram representation of a telephone central office comprising three remote telephone concentrators and trunks to other telephone offices.
Figure 2:
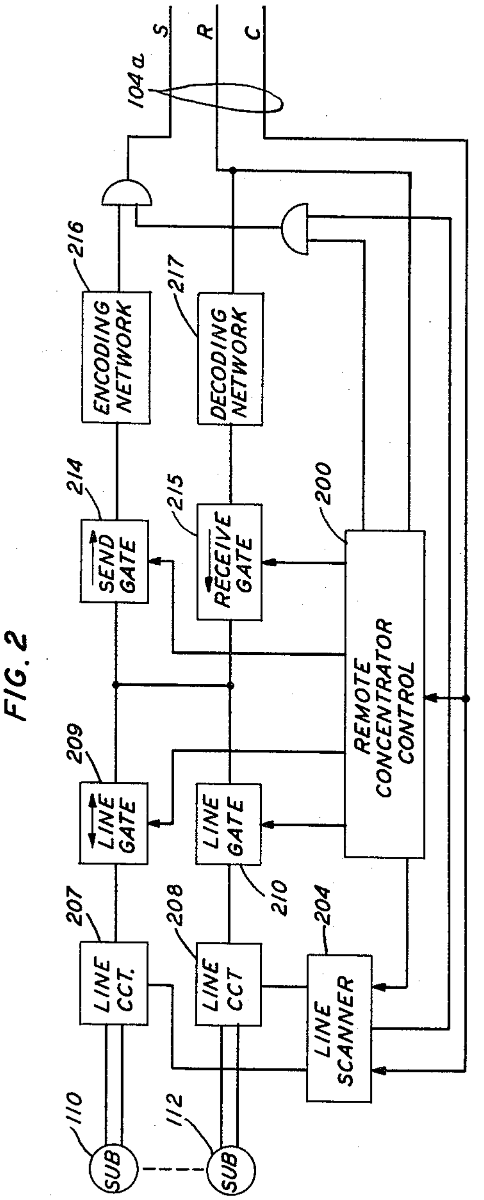
FIG. 2 is a representation in block diagram form of the remote concentrator switching and control portion of the telephone office in FIG. 1.
Figure 3:
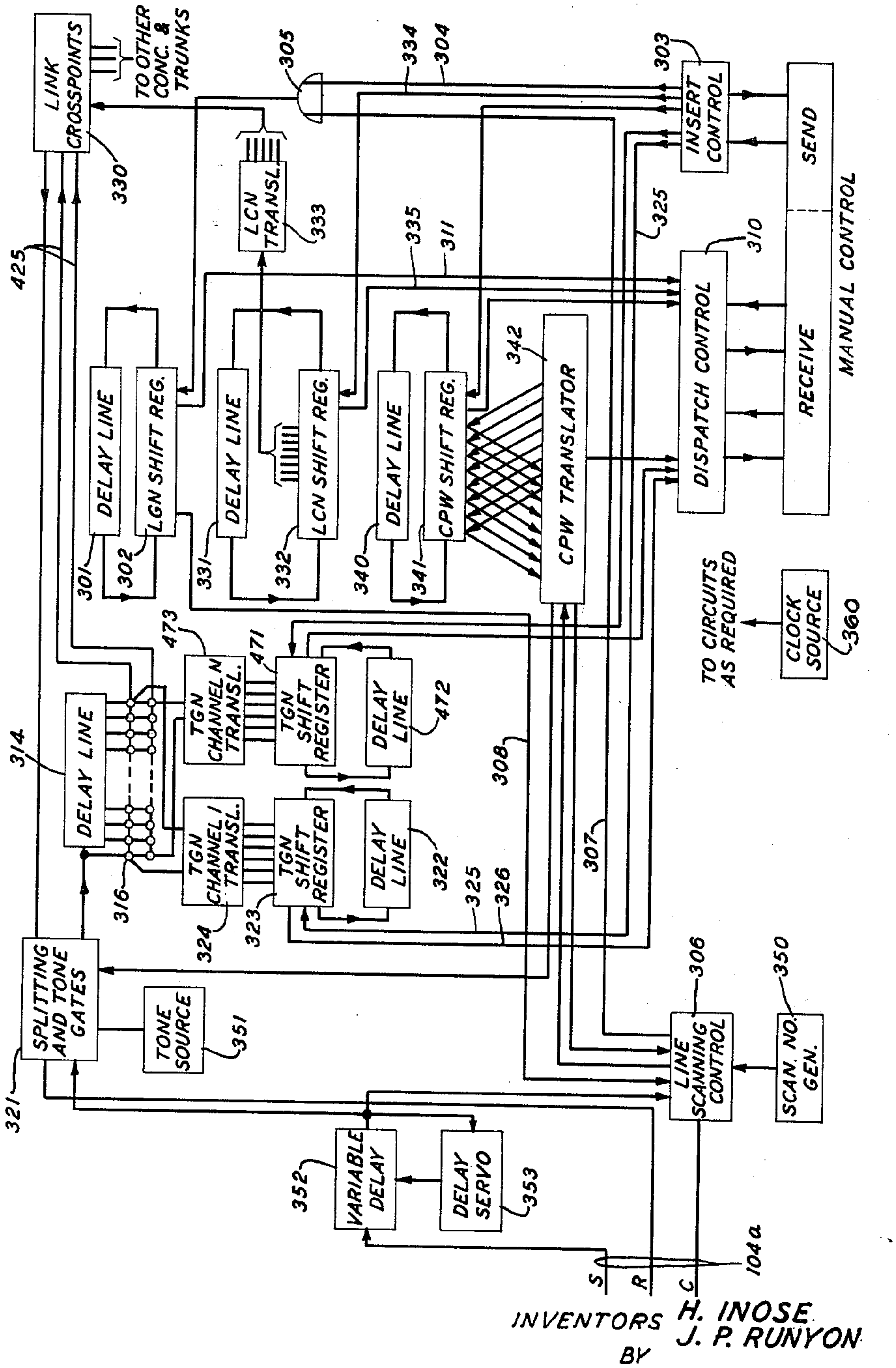
FIG. 3 is a representation in block diagram form of a portion of the control equipment of the telephone office in FIG. 1 and in which is incorporated our invention.

Turning now to the drawing, the time division telephone system depicted in FIGS. 1–3 is similar to the telephone system disclosed in the aforementioned James et al. patent which will be described in general terms hereinafter to provide a basis for the detailed description of the improvements realized in accordance with our invention and depicted in FIGS. 3 and 4.

In FIG. 1 the telephone office comprises the remote concentrators 101, 102 and 103 and the interoffice trunk facilities 100, each connected via corresponding transmission channels 104*a*–104*d*, to the common control 105. The remote concentrators are so named because of the connection thereto of a plurality of individual telephone subscriber lines concentrated in the same remote area. Each interconcentrator or intraconcentrator connection as well as connections between a concentrator and a foreign exchange is completed through the office control 105 via the appropriate transmission channels 104*a*–104*d* on a time division basis. The office control 105 assigns to a calling subscriber line a particular time slot in a recurring cycle of time slots during which time information to and from the calling and called subscriber lines is transferred over the appropriate channels 104*a*–104*d*. Similarly, other telephone connections are assigned distinct time slots in the recurrent cycle of time slots such that the various channels are shared in time by the active telephone calls, and a considerable saving in telephone cable is the beneficial result.

Operation of the telephone office on a synchronous basis, as described in the aforementioned James et al. system, presupposes that each pair of lines in communication exchange information in the same time slot with bilateral transmission being accorded by the appropriate transmission channels. Thus considering, for example, that subscriber 110 connected to concentrator 101 desires to place a call to subscriber 111 connected to concentrator 102, the office control 105 upon detection of the request for service assigns an idle time slot to subscriber 110 and then determines the condition of that time slot in concentrator 102. If it is idle, the connection between subscribers 110 and 111 is completed in that time slot.

However, it is apparent that this particular time slot may also be busy on another call in concentrator 102, such that the office control must search through its memory to determine a common idle time slot in the two concentrators 101 and 102. Upon determination of such a common idle time slot, idle switching connections in that time slot are located and the connection completed each time that time slot appears in the office cycle for the duration of the call.

In accordance with the instant invention, considerable improvement may be realized in such a system through a time slot transposition which overcomes the blocking problem encountered if the system fails to locate a common idle time slot. Thus subscriber 110, in requesting a connection to subscriber 111, may be assigned one time slot by the common control 105 and the subscriber 111 assigned a time slot distinct from that assigned to subscriber 110. Information then is received from subscriber 110 over the transmission bus 104a and is transposed in the common control 105 to the time slot assigned to subscriber 111 for transmission over bus 104b. Similarly, the information from subscriber 111 is transposed from the time slot assigned to his line to that assigned to subscriber 110.

The particular equipment required in the office control for this transposition will be described in general with reference to FIGS. 2 and 3 which correspond respectively to switching equipment at concentrator 101 and that portion of the office control 105 serving the concentrator 101. Duplicate equipment is provided in each remote concentrator and in the office control for each concentrator involved in the telephone office. FIGS. 2 and 3 correspond to FIGS. 2 and 3 of the above-identified James et al. patent FIG. 3 differing from that of the prior application by the inclusion therein of specific circuitry in accordance with our invention.

Each subscriber line associated with remote concentrator 101, as shown in FIG. 2, is connected to the concentrator switching network via two wire talking paths. Thus subscriber terminal 110 is connected through a conventional line circuit 207 to line gate 209, the latter being connected in turn to Send and Receive gates 214 and 215, respectively, of the transmission channel 104a. The line gates connected to active subscriber lines are enabled in distinct, selected time intervals or time slots of a repetitive cycle of time slots, and the Send and Receive gates in the common bus are enabled consecutively during each time slot. These gate operations are controlled by circuits located in the remote concentrator control 200. The remote concentrator control 200 in turn receives directive signals via the Receive and Control channels of the transmission channel 104a. The line gates 207 and 208 may be of the type described in Johannesen-Myers-Schwenker Patent 2,899,570, while the Send and Receive gates 214 and 215 may be included in a time division hybrid circuit of the type described in application Serial No. 702,149, filed December 11, 1957 of D. B. James and J. D. Johannesen, now Patent 2,936,338, issued May 10, 1960.

In order to establish a connection between two subscribers, the system first detects a request for service through a continual scanning process involving line scanner 204 in which the condition of each line in the remote concentrator is observed perodically in a supervisory time slot of the recurrent cycle. The subscriber off-hook condition is reported through the line scanner 204 to the line scanning control 306 (FIG. 3) via the Send lead of the transmission channel 104a and variable delay 352. Upon verification of this request for service, the office control establishes in its memory a number corresponding to the calling line in a particular time slot and immediately preceding this time slot in each recurrent cycle thereafter, this number will be transmitted via the control channel to the remote concentrator control 200 which in turn translates the coded number and activates the particular line gate associated with the calling line during the selected time slot.

Concurrently with the operation of a line gate, the Send gate 214 in the transmission channel 104a is enabled so as to transfer information from the calling line to the Send lead of the transmission channel. Subsequently in the same time slot the Receive gate 215 is enabled while the Send gate 214 is disabled, thereby permitting transfer of information from the Receive lead of the transmission channel to the calling line. In this fashion bilateral transfer of information between an active line and the transmission channel is completed in the particular time slot assigned to the active line. A more detailed description of the operation involved in the remote concentrator is contained in the aforementioned James et al. patent.

In order to further assist in an understanding of the particular timing involved in this system, it would be advisable to consider a specific system timing arrangement. Thus consider that the repetitive cycle of time slots, referred to as a "frame", consists of 24 time slots, each time slot having a duration of 5.2 microseconds. The various gates in the system are controlled by precisely timed signal pulses so as to transfer information between calling and called subscribers in the preassigned time slots. Eight binary digits or bits of information comprise a word which may be transmitted in each time slot. Thus with 24 time slots, 192 bits of information may be transferred per frame period.

Timing within a frame is established by a common clock pulse source 360, FIG. 3, serving all concentrators and all office control equipment, as described in greater detail in the aforementioned James et al. patent application. This source provides two phases of the basic pulse rate 180° apart, for use throughout the central office. The source also provides pulse signals to distinct bit, word and frame conductors as required. Thus a point in time at the central office is defined by an indication of the frame, word or time slot, bit and phase. Individual frame, word, bit and phase conductors are employed in various combinations to establish the proper timing for operation of various of the control devices, and individual conductors are labeled accordingly.

In each of the first 23 time slots of a frame, four distinct designations must be maintained in the control equipment of FIG. 3 concerning the call being served. These four words are the line or trunk gate number, the link crosspoint number, the call progress word, and the tap gate number. The information handled in the 24th time slot concerns establishment of the call and is not assigned to any particular call. The four information words are stored in distinct circulating memories, each of which includes a delay line and a short shift register, the total loop delay being equivalent to the frame interval; i.e., 24 time slots of 8 bits duration, or a total of 192 bit periods.

The circulating memory for the Line Gate Number comprises the delay line 301 and the shift register 302. Line Gate Numbers for the first 23 time slots may be inserted in this memory loop under control of the Insert Control 303 via conductor 304 and OR gate 305. Line Gate Numbers may also be inserted in the Line Gate Number shift register 302 by the Line Scanning Control 306 via conductor 307 and OR gate 305. Line Gate Numbers are read out of the shift register 302 on conductor 308 and are transmitted to the remote concentrator over the control conductor of the transmission channel 104a through the Line Scanning Control 306. This Line Gate Number Information is utilized by control equipment in the remote concentrator to enable the particular line gate corresponding to the Line Gate Number so as to connect the associated line to the transmission channel for transfer of information during the assigned time slot. This Line Gate Number is also transmitted to the Dispatch Control 310 via conductor 311 where it is available to the Receive Portion of the office manual control.

In accordance with an aspect of our invention, a plurality of tap gates such as 316 are connected to corresponding taps on delay line 314 receiving information from the remote concentrator over the transmission channel 104a through Variable Delay 352 and Splitting and Tone Gates 321. The tap gates are enabled in accordance with Tap Gate Numbers contained in the circulating memories such as that comprising delay line 322 and Tap Gate Number shift register 323, the output of which is translated in the Tap Gate Number translator 324 to enable the particular desired tap gate in a given time slot. Tap Gate Numbers for all or a selected plurality of the 24 time slots may be inserted in the tap gate memory loop under control of the Insert Control 303 via conductor 325 and may be transmitted for control purposes from the memory loop to the Dispatch Control 310 via conductor 326.

Figure 4:
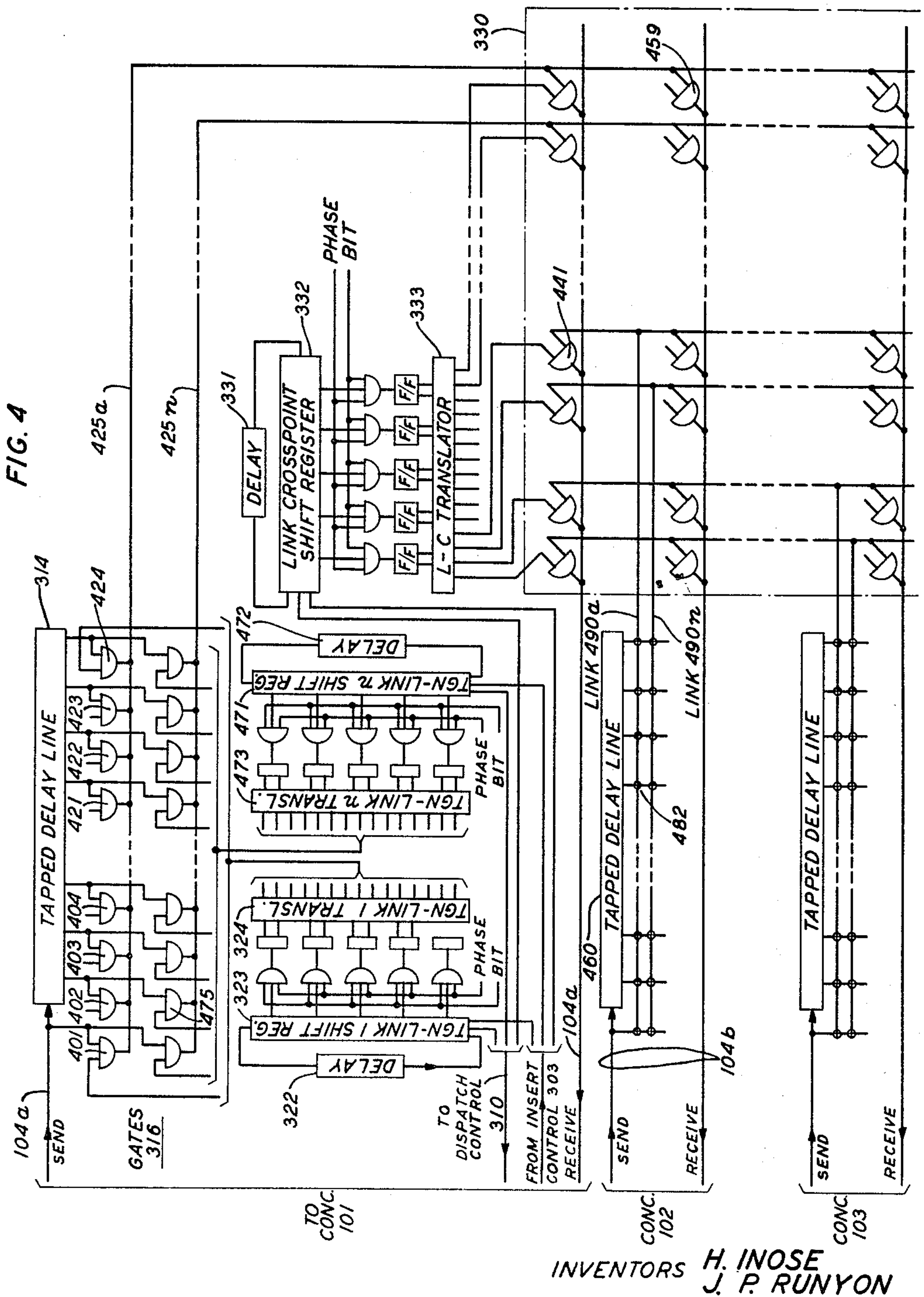
FIG. 4 is a representation in greater detail of the specific components in the system particularly concerned in the illustrative embodiment of our invention for time slot transposition in the telephone office control.

The switching network further comprises a network 330 of link crosspoints which are shown in greater detail in the circuit of FIG. 4. A connection between calling and called subscribers is completed by operation of an appropriate link crosspoint for each direction of transmission. Thus for the control equipment indicated in FIG. 3, serving concentrator 101 of FIG. 1, a link crosspoint in the network 330 is operated to complete the connection for transmission of information from a calling subscriber in concentrator 101 to a called subscriber in the same or another concentrator. Another link crosspoint either in the network 330 or in a similar network serving another concentrator is operated to complete a transmission path from the called party to the calling party. Control of the link crosspoints is effected by a circulating memory comprising delay line 331 and the Link Crosspoint Number shift register 332. A translator 333 receives the Link Crosspoint Number and translates it so as to energize the particular desired link crosspoint in the network 330 at the appropriate time. As in the case of the Line and Tap Gate Numbers, the numbers circulated through the link crosspoint circulating memory are provided by the Insert Control 303 via conductor 334. Also the Link Crosspoint Numbers stored in the circulating memory are available to the Receive Portion of the manual control via conductor 335 and the Dispatch Control 310.

It is apparent that the myriad of switching operations taking place in this system in precisely timed intervals requires that the progress in the establishment and maintenance of a call be followed by additional control equipment. The Call Progress Word is the designation accorded the current status of a call for the benefit of all other elements in the common control. Call Progress Words are stored in a final circulating memory comprising delay line 340 and Call Progress Word Shift register 341. At selected intervals the current Call Progress Word relating to a particular call is received in the Call Progress Word translator 342 from which it may be utilized to control various other switching and control elements. Upon the change in the status of a call a new Call Progress Word will replace that recorded in the circulating memory relating to a particular call by action of the Call Progress Word translator 342 and the Insert Control 303. A more complete description of the composition and operation of corresponding circulating memories and translators may be found in the aforementioned James et al. patent.

In summary, four information words; viz., Line Gate Number, Link Crosspoint Number, Tap Gate Number and Call Progress Word, are circulated in individual memories. The Line Gate Numbers control the operation of the individual line gates at the remote concentrators to effect connection of the subscriber lines to the common transmission bus. The Link Crosspoint Numbers are transmitted at the appropriate times to the Link Crosspoint Number translator to effect control of the link crosspoints in accordance with the desired transmission bus interconnections. The Tap Gate Numbers are translated at the appropriate times to operate tap gates connected to the delay line 314 in the transmission bus so as to implement the time slot interchange directly concerned with the instant invention.

Other components indicated in FIG. 3 are described only in brief hereinafter inasmuch as they are not directly concerned in the operation of the system with respect to the instant invention and are completely described in the aforementioned James et al. patent. The line scanning control 306 and the scan number generator 350, in conjunction with other control equipment in the common control, serve to observe the condition of each subscriber line connected to the remote concentrator 101 and to detect and record in the 24th time slot an indication of the condition of each of the subscriber lines as they are scanned in sequence. The system transmits information over the transmission channels and through the common control in pulse code form and the Splitting and Tone Gate circuit 321 provides means for sending coded supervisory tones from the source 351 to the remote concentrator without having to engage link crosspoints or tap gates; tone source 351 may be of the type disclosed in application Serial No. 760,480, filed September 11, 1958, of H. E. Vaughan, now Patent 3,050,589, issued August 21, 1962.

It is apparent that a variable time delay results during transmission of the signal from the remote concentrator to the common control. In order to compensate for this transmission delay, the Variable Delay 352 and the Delay Servo 353 serve to adjust the length of delay to be exactly one frame interval such that the common control receives the information in the same time slot in which it was transmitted from the remote concentrator except that it is one frame interval later; the Delay Servo 353 may be of the type shown in application Serial No. 706,358 of W. A. Malthaner, filed December 31, 1957, now Patent 2,960,571, issued November 15, 1960.

FIG. 4 depicts the particular circuitry and components in the common control which are directly concerned in the time slot transposition operation in accordance with the specific illustrative embodiment of our invention. Thus the Send lead of the transmission channel 104*a* terminates, as seen in FIG. 3, in the tapped delay line 314. Adjacent taps or output terminals on the delay line are spaced apart by a measured delay corresponding to a time slot. Each such output terminal is connected to an input of one or more coincidence gates 316, the outputs of which are connected to a corresponding link such as link 425*a*. Considering 24 time slots in the recurrent cycle, there may be 24 coincidence gates 401–424 connecting outputs of the tapped delay line to a single link 425*a*. The number of coincidence gates 316 as well as the number of links may be varied according to the particular traffic requirements of the system.

The coincidence gates 316 corresponding to each link are selectively activated by information stored in a distinct circulating memory loop. Thus, the memory loop for gates 401–424 includes shift register 323 and delay line 322 acting at properly timed intervals through the corresponding translator 324. The particular tap gate 316 to be activated in any given time slot is identified by a code number transmitted from the Insert Control 303 to the shift register 323. Thereafter in the prescribed time slot this Tap Gate Number is transmitted in parallel form to the translator 324 which in turn provides an activating signal to the particular tap gate 316 involved in the connection to the link 425*a* in the particular time slot.

Simultaneously with activation of a particular tap gate, connections are made in the link crosspoint network 330 between the link to which the tap gate is connected and the Receive channel of the common transmission bus leading to the called subscriber's line. This connection involves activation of a link crosspoint switch such as 441, there being a distinct link crosspoint switch for each link and concentrator Receive channel crosspoint in the system. Thus with $n$ concentrators and $m$ links, the system would provide $n^2m$ link crosspoint switches in the link crosspoint network 330 of the common control.

The link crosspoint switches such as 441 are selectively enabled by the control circuitry associated with each concentrator, which may include, as described with reference to FIG. 3, a memory loop having a shift register 332 and delay line 331 associated with a translator 333. Again the code number identifying a particular link crosspoint switch is inserted in the shift register 332 by the Insert Control 303 so as to be available in the selected time slot for gating into the translator 333. Upon coincidence of the proper bit and phase timing pulses at the coincidence gates connected to the outputs of the shift register 332, the register output signals are gated to storage cells or flip-flops at the input of translator 333 and held therein for one time slot period during which the desired interconnection is effected. The subsequent translation serves to provide an activating signal on the input lead of the selected link crosspoint switch. Thus a tap gate and a link crosspoint switch are operated in the same time slot, which time slot, as will be seen hereinafter, is the particular one assigned to one of an active pair of lines, and which line may be located in the same concentrator as the other line in the pair or in another remote concentrator.

Through a simple exension of the principle of this invention connections may be completed between a pair of lines located in concentrators connected to distinct central offices with a minimum of block ing difficulty, as dictated solely by the traffic requirements of the interconnected systems.

This time slot interchange operation may be readily understood from consideration of the following description of the connection of a pair of lines in communication through the telephone office. Thus consider, for example, that subscriber 110 desires to communicate with subscriber 111 (FIG. 1). The connection is established in the manner disclosed in the aforementioned James et al. patent to the point of assigning an idle time slot to the calling subscriber 110 and determining the concentrator to which the called subscriber 111 is connected.

In the case of the James et al. system, the office control equipment then proceeds to locate a common idle time slot in the concentrators associated with the respective calling and called lines, with preference being accorded the time slot originally assigned to the calling line. It is apparent, however, that the time slot assigned to subscriber 110, which was of course previously idle in concentrator 101, may be occupied in concentrator 102 on an intraconcentrator call or on an interconcentrator call involving a concentrator other than 101. In this instance the office control equipment proceeds to determine the availability of succeeding time slots in both concentrators 101 and 102 until a common idle time slot is found.

In contrast to this arrangement, our invention removes the attendant delay by obviating the need to determine a common idle time slot. Thus upon determination of the time slot assigned to the calling subscriber 110, the office control equipment immediately interrogates the control equipment associated with concentrator 102 to determine the time slots which are idle therein. If the time slot assigned to the calling subscriber 110 is not idle in the concentrator 102, successive time slots are investigated and the first available idle time slot in concentrator 102 is assigned to the called subscriber 111.

Thereupon, the time slot assignments are registered in the Dispatch Control 310 (FIG. 3) and are available to the Manual Control for assignment to the various circulating memories as required. Thus the Line Gate Numbers corresponding to the calling and called lines are stored in the Line Gate Number shift registers for the respective concentrators in the assigned time slot. For example, consider that time slot 3 is assigned to the calling subscriber 110 and time slot 6 is assigned to the called subscriber 111. The appropriate Line Gate Number for operation of the line gate associated with subscriber 110 is thereupon stored in the LGN shift register 302 (FIG. 3) via the Insert Control 303 so as to be transmitted to the remote concentrator 101 for appropriate operation of the line gate at each cyclic appearance of the assigned time slot 3. Similarly, a Line Gate Number is stored in the LGN shift register associated with remote concentrator 102 in time slot 6 for operation of the line gate associated with subscriber 111.

Information from a subscriber 110 thereupon arrives at the input to the Tapped Delay Line 314 so as to be transmitted to the called subscriber 111 in time slot 6 assigned to his line. Similarly, information from subscriber 111 will arrive at the input to the Tapped Delay Line 460 in time slot 6 and must be delayed therein for a sufficient period to permit its transmission in time slot 3 of the subsequent cycle of time slots to subscriber 110. Considering 24 times slots in the recurrent cycle, the foregoing transposition is accomplished by storing two tap gate designations $TG_1$ and $TG_2$ in the common control, $TG_1$ representing the arithmetic difference between the two assigned time slots, and $TG_2$ representing 24 minus $TG_1$.

A unit value is added to each of these tap gate designations to accommodate the situation in which the assigned time slots are identical and thus no delay is required. The stored designations thus may be stated as follows:

$$TG_1=(TS_1-TS_2)+1$$
$$TG_2=(24-TG_1)+1$$

The tap gate designation $TG_1$ is transmitted from the common control to the Tap Gate Number shift register corresponding to the subscriber assigned the lowest value time slot. Thus, in this example, $TG_1$ is transmitted to Tap Gate Number shift register 323 in the control equipment associated with subscriber 110 transmitting information in time slot 3. $TG_1$ in this instance equals 4, so that the coded designation stored in the Tap Gate Number shift register 323 will serve to operate the fourth tap gate 404 on Tapped Delay Line 314 in time slot 6.

Activation of the tap gate 404 in this manner permits information received in the Tapped Delay Line 314 in time slot 3 to be transmitted over link 425*a* in time slot 6. Concurrently, the Insert Control 303 transmits a coded designation of the appropriate link crosspoint switch to the shift register 332 such that in time slot 3 this coded designation is gated to the translator 333 to energize the control lead of link crosspoint switch 441, thereby permitting receipt in concentrator 101 of information from concentrator 102 via the Receive lead of transmission channel 104*a*.

Corresponding operations occur in the office control equipment, not shown, associated with concentrator 102 such that the appropriate tap gate on the Tapped Delay Line 460 is operated to transpose information received therein in time slot 6 to time slot 3. This is accomplished by the insertion of $TG_2$, which equals 21 in this instance, in a Tap Gate Number shift register for concentrator 102, and the consequent operation of the 21st tap gate 482 during time slot 3. Information received in delay line 460 in time slot 6 is thereupon transmitted over link 490*a* and link crosspoint switch 441 to the Receive lead of transmission channel 104*a* in time slot 3. Also, the office control equipment associated with concentrator 102 serves to operate link crosspoint switch 459 in time slot 6 so as to permit transfer of information from link 400*a* to the Receive lead of the transmission channel 104*b* and thence to the subscriber 111. The generation of $TG_1$ and $TG_2$ and their transmission to the appropriate TGN shift registers is readily accomplished by logic equipment available in the office control described in the above-mentioned James et al. patent.

Consider now that a subscriber 112, connected to concentrator 101, places a call to a subscriber 113 associated with the concentrator 103 while the above-described conversation is in progress and that the first idle time slot available for this call in concentrator 103 is time slot 6. Insofar as the operation of the office control equipment is concerned, this subsequent assignment of idle time slot 6 in concentrator 103 is permissible. However, it is apparent that upon attempting to establish this call through concentrator 101 it would be impossible to transpose information from the subscribers 110 and 112 to a single link 441 in the same time slot 6.

Advantageously, in accordance with this embodiment of our invention, additional links such as 425*n* and the associated tap gates and link crosspoint switches may be added to the system in order to avoid such a blocking condition. The office control necessarily is aware of all of the busy time slots in all of the concentrators connected to the office. Thus in attempting to assign an idle time slot in one concentrator to a particular call, the Tap Gate Number shift registers are first interrogated to determine whether that time slot was priorly assigned to other calls. This may be readily accomplished by observing the contents of the Tap Gate Number memory loops each time a time slot assignment is attempted. If a tap gate is active on another call in that time slot in the shift register to which the resultant $TG_1$ or $TG_2$ would normally be applied, the office control reroutes the $TG_1$ or $TG_2$ designation to an alternate memory loop such as that including shift register 471 and delay line 472 (FIG. 4), and the corresponding translator 473 thereupon will provide a signal to enable the appropriate tap gate so as to transfer information from the Tapped Delay Line 414 to the second link 425*n* in the time slot assigned to the called subscriber.

To further illustrate the situation, assume that connections are established between subscriber 110, concentrator 101, and subscriber 111, concentrator 102, in time slots 3 and 6, respectively, and between subscriber 112, concentrator 101, and subscriber 113, concentrator 103, in time slots 5 and 6, respectively, time slot 6 having been found idle in both concentrators 102 and 103. In this instance delay line 314, associated with concentrator 101 is called upon to transfer information from subscribers 110 and 112 to the transmission channel 104*a* in time slot 6. This is implemented by the insertion of the coded designation $TG_1$ of tap gate 404 in the shift register 323, as described hereinbefore, such that information received from subscriber 110 in time slot 3 is transferred in time slot 6 through tap gate 404 to link 425*a*. Simultaneously, the coded designation $TG_1$ of tap gate 475 is inserted in the shift register 471, such that information received in the Tapped Delay Line 314 from subscriber 112 in time slot 5 is transferred to link 425*n* through tap gate 475 in time slot 6. Of course operation of the appropriate link crosspoint switches is accorded to facilitate completion of the connections to the respective Receive leads of the transmission channels 104*b* and 104*c*.

As traffic requirements dictate, more or less links may be connected in the system, each link having a corresponding distinct group of tap gates, link crosspoint switches and associated memory and translation equipment. Similarly, the Tapped Delay Line may be expanded or contracted to selected lengths corresponding to between 12 and 24 time slots in a 24 time slot cycle, with the accompanying increase or decrease in the number of required tap gates. In addition, the delay means may comprise a shift register or other suitable means for delaying the transmitted information from one time slot to another as realized with the Tapped Delay Line disclosed in the illustrated embodiment.

It is to be understood that the above-described arrangements are illustrative of the application of the principles of the invention. Numerous other arrangements may be devised by those skilled in the art without departing from the spirit and scope of the invention.

What is claimed is:

1. In a communication system, a plurality of lines, a central office, a plurality of concentrators remote from said central office each terminating a distinct group of said lines, means for transmitting information between active pairs of said lines through said central office comprising a distinct transmission channel extending between each concentrator and the central office, a time division switching network associated with each of said concentrators for interconnecting pairs of said lines in distinct time slots of a repetitive cycle, and means for transposing information received over said distinct transmission channel from a calling line in one concentrator in one time slot to a different time slot for transmission over the distinct transmission channel connected to the concentrator associated with the called line.

2. A telephone system comprising a plurality of lines arranged in distinct groups, a plurality of concentrators each connected to a distinct group of said lines, a central office, a plurality of transmission channels, each channel extending from said central office to a corresponding one of said concentrators, a time division switching network for connecting said lines through the corresponding concentrator to the corresponding transmission channel in distinct time slots of a regularly recurring cycle of time slots, means for controlling said switching network to connect one line of a communicating pair of said lines to the corresponding transmission channel in a first time slot and to connect the other line of said communicating pair of lines to its corresponding transmission channel in a second time slot, and means at said central office for transposing information received from said communicating pair of lines between said first and second time slots.

3. A time division communication system comprising a plurality of lines arranged in distinct groups, a transmission channel corresponding to each of said groups of lines, a time division switching network for connecting said lines to said corresponding channel in distinct time slots of a repetitive cycle, said switching network comprising means for connecting one line of a communicating pair of said lines to the corresponding channel in a first time slot and the other line of said communicating pair of lines to the corresponding channel in a second time slot, and means for interconnecting said corresponding channels comprising means for transposing information in said corresponding channels between said first and second time slots to complete the transfer of information between said communicating pair of lines.

4. A time division communication system comprising a plurality of lines arranged in groups, a distinct transmisison channel associated with each of said groups of lines, a time division switching network for connecting said lines to said corresponding channels in distinct time slots of a repetitive cycle, said switching network comprising means for connecting one line of a communicating pair of said lines to the corresponding channel in a first time slot and the other line of said communicating pair of lines to the corresponding channel in a second time slot, and means for interconnecting the channels corresponding to the calling and called lines comprising means for transposing the time slots assigned to said communicating pair of lines whereby information transmitted from one line of said communicating pair of lines in the assigned time slot is received by the other line in the communicating pair in its assigned time slot.

5. A time division communication system comprising a plurality of lines arranged in distinct groups, a transmission channel comprising first and second leads for transmission in opposite directions corresponding to each of said distinct groups of lines, means for connecting one line of a communicating pair of said lines to a first channel corresponding to said one line in one time slot of a recurrent cycle and the other line of said communicating pair of lines to a second channel corresponding to said other line in another time slot of said recurrent cycle, delay means having an input terminal connected to the first lead in said first channel, a plurality of output terminals at intervals in said delay means representative of distinct amounts of delay equivalent to said time slots, and means for connecting a selected one of said output terminals to said second lead in said second channel.

6. A time division communication system comprising a plurality of two wire lines, a transmission channel including a pair of leads for transmission in opposite directions, first switching means for connecting active ones of said lines to said channel in selected time slots of a repetitive cycle to transfer information from said lines to one of said pair of leads and from the other of said pair of leads to said lines, delay means connected to said one lead for receiving information from one line of a pair of said lines in communication in the time slot assigned to said one line, and second switching means for selectively connecting one of a plurality of output terminals of said delay means to said other lead for transmitting the information to the other line of said pair of lines in communication in the time slot assigned to said other line.

7. A time division communication system in accordance with claim 6 wherein said second switching means comprises a plurality of gates connected to said output terminals spaced at distinct intervals along said delay means, the delay in each interval corresponding to a time slot, and a plurality of crosspoint switches for connecting the selected delay means output terminal to said other lead.

8. A time division communication system in accordance with claim 7 and further comprising a plurality of links interconnecting distinct groups of said gates and distinct groups of said crosspoint switches, and means for activating said gates and said crosspoint switches so as to interconnect said pair of leads through a selected one of said links.

9. In a communication system, a plurality of lines including active lines communicating in pairs, a common transmission channel, switching means for connecting said active lines to said channel in distinct time slots of a repetitive cycle, and means for transposing information between distinct time slots assigned to an active pair of lines in communication, said last-mentioned means comprising delay means connected to said channel to receive information from one line of said active pair in a first time slot, and means for applying the output of said delay means to said channel to transmit information to the other line of said active pair in a second time slot.

10. A communication system comprising a common control center having a central switching network, a plurality of remote line concentrators each terminating a distinct group of lines, a distinct transmission channel interconnecting the central switching network and each remote line concentrator, means for connecting a calling line associated with a first remote line concentrator to the corresponding transmission channel in a first time interval of a repetitive cycle of time intervals, means for connecting the called line associated with said first or a second remote line concentrator to the corresponding transmission channel in a second time interval of the repetitive cycle, and means for transposing information between said first and second time intervals to complete the connection between said calling and called lines, said last-mentioned means comprising delay means associated with each group of lines and connected to the corresponding transmission channel so as to receive information in the assigned time intervals from each active line in the group, output gates connected to said delay means at intervals providing delay equivalent to said time intervals, means for connecting said output gates to the transmission channel and means for selectively enabling said output gates in the assigned time intervals to transmit information to each active line.

11. A communication system in accordance with claim 10 wherein said connecting means comprises switching means having access to the transmission channel to each of said remote line concentrators and further comprising means for selectively enabling said switching means in each time interval of the repetitive cycle of time intervals.

12. A communication system in accordance with claim 11 and further comprising a plurality of links interconnecting said output gates and said switching means, said means for enabling said output gates and said switching means comprising means for enabling a plurality of said output gates and a plurality of said switching means concurrently to accommodate a plurality of calls involving one of said remote line concentrators in the same time interval of said repetitive cycle.

13. A communication system in accordance with claim 12 wherein said delay means comprises a tapped delay line.

14. A telephone system comprising a plurality of lines divided into distinct groups, control means common to said groups, a single transmission channel interconnecting each of said groups of lines with said control means, means associated with each group of lines for connecting the active lines in each group to said transmission channel in individual time intervals of a recurrent cycle of time intervals, and time slot transposing means in said control means for receiving information from a calling one of said lines over said transmission channel in one time interval and transmitting it to a called one of said lines over said transmission channel in a second time interval.

15. A telephone system in accordance with claim 14 wherein said time slot transposing means comprises a delay line having a plurality of taps spaced from one another by an amount equivalent to a time interval in the recurrent cycle of time intervals, and means for controlling the withdrawal of information from said delay line at said taps in accordance with the number of time intervals intermediate those assigned to the calling and called lines.

16. A telephone system in accordance with claim 15 wherein said controlling means comprises tap gates connected to each of said taps and link gates connected between said tap gates and said transmission channel leading to each of said distinct groups of lines, and means for enabling a distinct tap gate and a distinct link gate in the selected time interval to complete the connection between said calling and called lines.

17. A telephone system in accordance with claim 16 and further comprising a plurality of links interconnecting said tap gates and said link gates, said controlling means comprising means for enabling a plurality of said tap gates and a plurality of said link gates in the same time interval to complete a plurality of connections between calling and called lines in which a plurality of the active lines are in one of said distinct groups of lines.

18. In a time division telephone system, a plurality of telephone lines arranged in distinct groups, a distinct transmission channel corresponding to each of said line groups, each of said channels comprising a send lead and a receive lead, a time division switching network associated with each of said line groups for connecting selected lines to the corresponding line group transmission channel in distinct time slots of a regularly recurring cycle of time slots whereby a plurality of lines in distinct groups may be connected to the respective corresponding transmission channels in the same time slot, and means for completing a connection from a calling line assigned a first time slot in a first group to a called line in a second group in which said first time slot is busy and a second time slot is idle, said last-mentioned means comprising a first delay element connected to the send lead of the transmission channel corresponding to said first group, a second delay element connected to the send lead of the transmission channel corresponding to said second group, and means for selectively connecting said first and second delay elements to the receive leads of the transmission channels corresponding to said second and first groups of lines respectively in said second and first slots respectively.

19. In a time division telephone system, a plurality of lines arranged in distinct groups, a transmission channel comprising a send lead and a receive lead corresponding to each of said groups, a delay element terminating the send lead of each of said transmission channels, time division switching means associated with each of said line groups for connecting lines in each group to the corresponding transmission channel in distinct time slots of a repetitive cycle of time slots, and means for completing a connection between a calling line in one group and a called line in another group comprising means for connecting a selected output of each of the delay means terminating the send leads of the corresponding first and second group transmission channels to the receive leads of the second and first group transmission channels respectively.

References Cited in the file of this patent

UNITED STATES PATENTS

| | | |
|---|---|---|
| 2,917,583 | Burton et al. | Dec. 15, 1959 |
| 3,049,593 | Touraton et al. | Aug. 14, 1962 |

UNITED STATES PATENT OFFICE

CERTIFICATE OF CORRECTION

Patent No. 3,172,956 March 9, 1965

Hiroshi Inose et al.

It is hereby certified that error appears in the above numbered patent requiring correction and that the said Letters Patent should read as corrected below.

Column 2, line 60, after "connecting" insert -- a tapped delay line to the transmission channel from each --.

Signed and sealed this 14th day of September 1965.

(SEAL)
Attest:

ERNEST W. SWIDER
Attesting Officer

EDWARD J. BRENNER
Commissioner of Patents

Disclaimer 3,172,956.—*Hiroshi Inose*, Tokyo, Japan and *John P. Runyon*, Mendham, N.J. TIME DIVISION SWITCHING SYSTEM FOR TELEPHONE SYSTEM UTILIZING TIME-SLOT INTERCHANGE. Patent dated Mar. 9, 1965. Disclaimer filed May 5, 1980, by the assignee, *Bell Telephone Laboratories, Incorporated.*

Hereby enters this disclaimer to all claims of said patent.

[*Official Gazette July 1, 1980.*]